United States Patent
Young et al.

(10) Patent No.: US 7,250,845 B2
(45) Date of Patent: Jul. 31, 2007

(54) RADIO FREQUENCY IDENTIFICATION DEVICE WITH MOVABLE ANTENNA

(75) Inventors: David Young, Ambler, PA (US); Roger Wayne Mick, Chalfont, PA (US); Vincent A. Turco, Jr., Bensalem, PA (US); Michael Francis Walsh, Horsham, PA (US)

(73) Assignee: Two Technologies, Inc., Horsham, PA (US)

( * ) Notice: Subject to any disclaimer, the term of this patent is extended or adjusted under 35 U.S.C. 154(b) by 93 days.

(21) Appl. No.: 11/035,523

(22) Filed: Jan. 14, 2005

(65) Prior Publication Data

US 2005/0156040 A1    Jul. 21, 2005

Related U.S. Application Data

(60) Provisional application No. 60/536,965, filed on Jan. 16, 2004.

(51) Int. Cl.
*H01Q 1/08*    (2006.01)
(52) U.S. Cl. ............... 340/5.92; 235/385; 235/439; 340/572.7; 343/880; 455/575.7
(58) Field of Classification Search ............ 340/572.1, 340/572.7, 572.8, 5.92; 343/880–883, 878; 235/385, 435, 439; 455/575.1, 575.3, 575.4, 455/575.7
See application file for complete search history.

(56) References Cited

U.S. PATENT DOCUMENTS

| | | | |
|---|---|---|---|
| 5,539,194 A | 7/1996 | Miller et al. ............... 235/472 |
| 5,541,398 A | 7/1996 | Hanson ...................... 235/472 |
| 5,621,199 A * | 4/1997 | Calari et al. ............... 235/375 |
| 5,747,786 A | 5/1998 | Cargin, Jr. et al. ......... 235/472 |
| 5,978,655 A * | 11/1999 | Ohura et al. ................ 455/41.1 |
| 6,407,911 B1 | 6/2002 | Spence et al. .............. 361/683 |
| 6,415,978 B1 | 7/2002 | McAllister ............. 235/462.01 |
| 6,421,234 B1 | 7/2002 | Ricks et al. ................ 361/683 |
| 6,581,837 B1 | 6/2003 | Hattersley .............. 235/462.44 |
| 6,672,512 B2 | 1/2004 | Bridgelall .............. 235/462.46 |
| 6,677,852 B1 | 1/2004 | Landt ........................ 340/10.1 |
| 6,732,933 B2 | 5/2004 | Waxelbaum ........... 235/462.25 |
| 6,832,729 B1 | 12/2004 | Perry et al. ............ 235/472.01 |
| 6,895,419 B1 | 5/2005 | Cargin, Jr. et al. ......... 708/131 |
| 6,946,950 B1 * | 9/2005 | Ueno et al. ............... 340/572.1 |
| 2002/0033418 A1 | 3/2002 | Knowles et al. ....... 235/472.01 |

(Continued)

FOREIGN PATENT DOCUMENTS

JP    2001155120 A  *  6/2001

(Continued)

Primary Examiner—Thomas Mullen
(74) Attorney, Agent, or Firm—Woodcock Washburn LLP

(57) ABSTRACT

A preferred embodiment of a hand-held radio frequency identification reader includes a first casing suitable for being grasped by a user, a second casing, and a transceiver housed within one of the first and second casings. The reader also includes an antenna housed within the second casing and communicatively coupled to the transceiver for communicatively coupling the reader to a radio frequency identification tag. The second casing is movably coupled to the first casing so that the second casing can be aligned with the radio frequency identification tag to substantially maximize a read distance of the reader while the first casing is held in a substantially fixed position in relation to the radio frequency identification tag.

31 Claims, 12 Drawing Sheets

U.S. PATENT DOCUMENTS

| | | | |
|---|---|---|---|
| 2002/0170969 A1 | 11/2002 | Bridgelall | 235/462.13 |
| 2004/0046031 A1 | 3/2004 | Knowles et al. | 235/462.46 |
| 2005/0082371 A1 | 4/2005 | Schmidt et al. | 235/462.45 |
| 2005/0087603 A1 | 4/2005 | Koenick et al. | 235/472.02 |
| 2005/0121523 A1 | 6/2005 | Schmidt et al. | 235/462.46 |
| 2005/0140507 A1 | 6/2005 | Nam et al. | 340/539.13 |

FOREIGN PATENT DOCUMENTS

| | | |
|---|---|---|
| WO | WO 200273512 A1 * | 9/2002 |

* cited by examiner

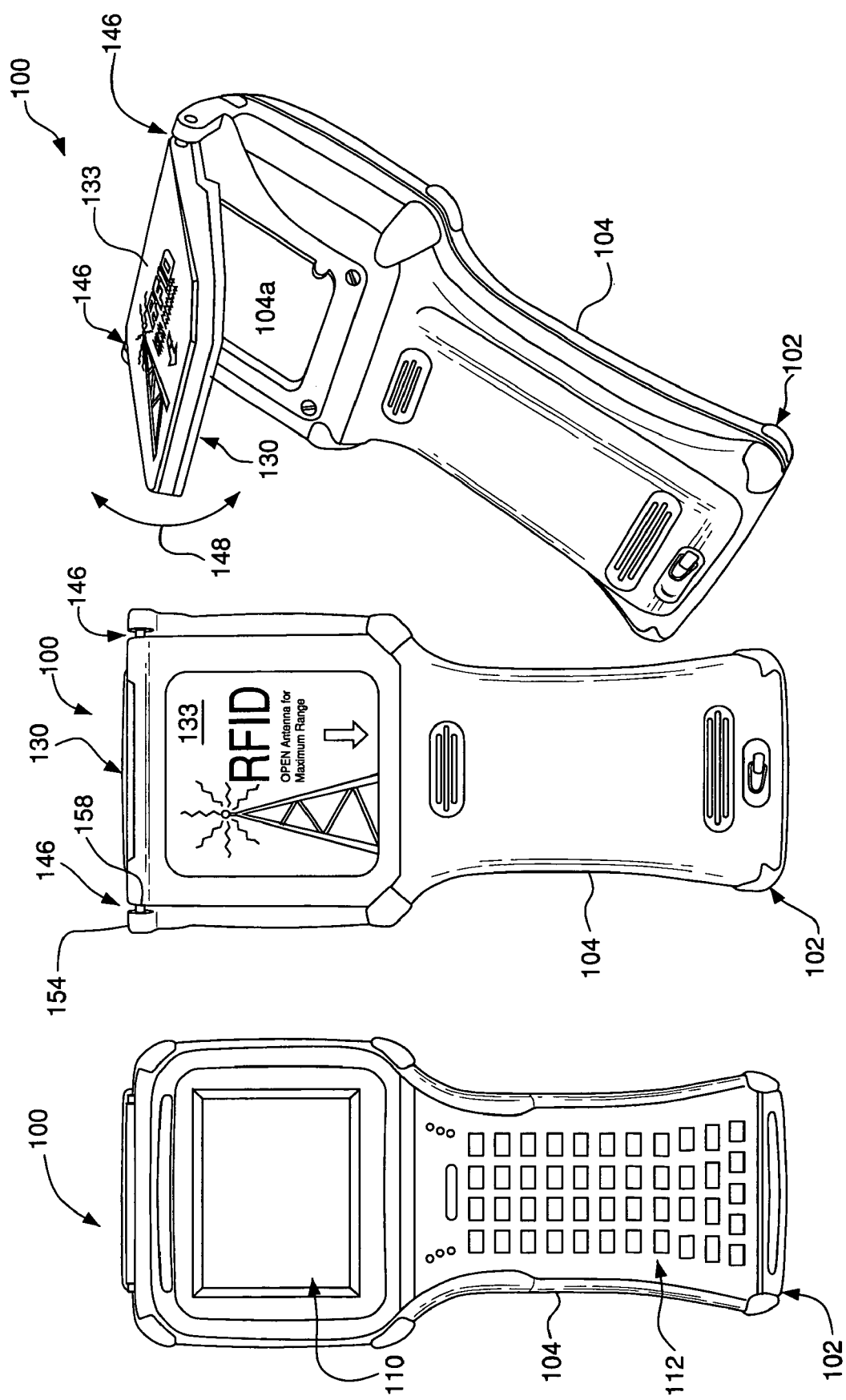

RADIO FREQUENCY IDENTIFICATION DEVICE WITH MOVABLE ANTENNA

CROSS-REFERENCE TO RELATED APPLICATIONS

This application claims priority under 35 U.S.C. § 119(e) to U.S. provisional application No. 60/536,965, filed Jan. 16, 2004, the contents of which is incorporated by reference herein in its entirety.

FIELD OF THE INVENTION

The present invention relates to radio frequency identification (RFID) systems, and more particularly, to an antenna for an RFID device such as an RFID reader.

BACKGROUND OF THE INVENTION

RFID systems are currently used in a variety of applications such as inventory control, theft prevention, access control, etc. RFID systems typically comprise a reader (also referred to as a tag reader or an interrogator) and a tag (also referred to as a transponder).

An RFID tag for use in an inductively coupled RFID system can comprise an integrated circuit (IC) that includes modulation circuitry and non-volatile memory. The tag also comprises an antenna, often referred to as an antenna/coil. RFID tags can be of the active or passive type. Active tags are powered by a battery within the tag. Passive tags derive power to operate by rectifying the alternating magnetic field generated by the reader.

The reader generates a carrier signal in the form of a radio frequency (RF) sine wave. Inductively-coupled RFID systems typically operate with a carrier-signal frequency of approximately 125 kHz or approximately 13.5 MHz. Carrier signals of these frequencies typically are generated by sending an alternating electrical current of a predetermined frequency across a coil-shaped antenna, commonly referred to as a coupler or an antenna/coupler, located in the reader.

The tag becomes inductively coupled to the reader when the tag enters the magnetic field associated with the carrier signal. A transistor in the tag shunts the antenna of the tag when the tag enters the magnetic field and, in the case of a passive tag, when the tag derives sufficient energy from the magnetic field to operate. The shunting of the antenna modulates the carrier wave by damping the amplitude thereof.

The reader continually monitors the carrier wave for modulation. The dampening of the amplitude of the carrier wave is interpreted by the reader as an indication that a tag is present in the magnetic field generated by reader.

The tag can be configured to transmit data to the reader by modulating the carrier wave in a particular manner. For example, the tag can be configured to repeatedly shunt the antenna of the tag so as to encode data in the resulting modulation of the carrier wave. The modulation of the carrier wave can be sensed by the reader, and the data encoded in the carrier wave can be decoded using algorithms in the process of the reader. This technique is commonly referred to as backscatter modulation.

Other types of RFID systems can use propagation coupling as the communication means between the reader and the tag. These types of systems typically operate with a higher carrier-wave frequency, e.g., 2.45 GHz, than inductively-coupled systems. The reader in a propagation-coupled system typically sends an RF signal by way of a dipole antenna. The tag, upon receiving the signal, uses an internal transmitter to send a return signal to the reader at a frequency different than that of the carrier frequency.

The maximum distance across which the reader and the tag can effectively communicate is commonly referred to as the read range of the reader. The strength of the carrier signal is believed to decrease exponentially as the distance between the reader and the tag increases linearly. The read range for an inductively coupled reader and tag is believed to be roughly equivalent to the diameter of the antenna of the reader.

The read range is also related to the relative orientation of the antennas of the reader and the tag. It is believed that the maximum read range can be achieved at a given operating condition when the antennas are substantially parallel. Positioning the antennas in this manner causes the magnetic field generated by the reader to be oriented in a direction substantially parallel to the tag antenna, maximizing the inductive coupling between the reader and the tag. (Read range also can be affected by other factors, such as noise, the quality factor of the reader's antenna and tuning circuit, the modulation and demodulation algorithms, the operating frequency of the reader and tag, etc.)

Readers can be of the hand-held variety. Hand-held readers are relatively small, so that the reader can readily be grasped and carried by the user. The antenna of a hand-held reader usually is incorporated into a common casing with the remainder of the reader's components. This imposes size constraints on the antenna. The read range of hand-held readers therefore is relatively small. The relatively small read range usually requires the user of a hand-held reader to orient the reader so that the antenna is substantially parallel to the tag being interrogated. (Hand-held readers also can be equipped one or more ports for communicatively coupling the reader to an external antenna.)

Hand-held readers often are used in applications where the user moves from item to item to interrogate RFID tags attached thereto. For example, a hand-held reader may be used to interrogate tags attached to palletized stacks of shipping crates or containers located a warehouse, shipping area, transporting vehicle, etc. To achieve maximum read range, the user must align the reader so that the antenna of the reader is substantially parallel to the antenna in the tag being interrogated. This process is repeated as the user approaches each pallet having a tag to be interrogated.

The need to repeatedly position the entire reader at a particular orientation when reading the tags can reduce the efficiency and speed with which the user can progress from tag to tag. Moreover, the location of the tags on the pallets may require the user to hold the reader at an orientation that places the user's hand, arm, etc. in an uncomfortable or unnatural position. This requirement potentially can lead to short-term effects such as muscle fatigue and strain and, over the long term, permanent injuries such as nerve or soft-tissue damage.

SUMMARY OF THE INVENTION

A preferred embodiment of a radio frequency identification device comprises a first and a second casing, and a transceiver housed within one of the first and the second casings, the transceiver comprising a transmitter for generating a radio frequency carrier signal and a receiver for detecting modulation of the radio frequency carrier signal caused by a radio frequency identification tag. The device also comprises an antenna housed within the first casing and communicatively coupled to the transceiver for broadcasting the radio frequency carrier signal, and sensing the radio frequency carrier signal after the radio frequency carrier signal is modulated by the radio frequency identification tag.

The device further comprises a controller housed within the second casing and communicatively coupled to the transceiver for interpreting information encoded in the radio frequency carrier signal by the radio frequency identification tag. The first casing is movably coupled to the second casing.

A preferred embodiment of a hand-held radio frequency identification reader comprises a first casing suitable for being grasped by a user, a second casing, and a transceiver housed within one of the first and second casings. The reader also comprises an antenna housed within the second casing and communicatively coupled to the transceiver for communicatively coupling the reader to a radio frequency identification tag.

The second casing is movably coupled to the first casing so that the second casing can be aligned with the radio frequency identification tag to substantially maximize a read distance of the reader while the first casing is held in a substantially fixed position in relation to the radio frequency identification tag.

A preferred method for interrogating a radio frequency identification tag with a radio frequency identification device comprises restraining a body of the radio frequency identification device in relation to the radio frequency identification tag while moving an antenna of the radio frequency identification device relation to the radio frequency identification tag to substantially optimize a read distance of the radio frequency identification device.

A preferred method for interrogating a plurality of radio frequency identification tags disposed on a plurality of items using a radio frequency identification reader comprises holding a portion of the radio frequency identification reader in a fixed position in relation to a first of the radio frequency identification tags disposed on a first of the items; moving an antenna of the radio frequency identification reader in relation to the first of the radio frequency identification tags so that the antenna is substantially parallel to an antenna of the first of the radio frequency identification tags; and communicatively coupling the radio frequency identification reader and the first of the radio frequency identification tags to obtain information from the first of the radio frequency identification tags.

The method also comprises holding the radio frequency identification reader in a fixed position in relation to a second of the radio frequency identification tags disposed on a second of the items so that the antenna of the radio frequency identification reader is substantially parallel to an antenna of the second of the radio frequency identification tags, the fixed position in relation to a second of the radio frequency identification tags being substantially the same as the fixed position in relation to a first of the radio frequency identification tags; and communicatively coupling the radio frequency identification reader and the second of the radio frequency identification tags to obtain information from the second of the radio frequency identification tags.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show an embodiment that is presently preferred.

The invention is not limited, however, to the specific instrumentalities disclosed in the drawings. In the drawings:

FIG. 1 is a front view of a preferred embodiment of a radio frequency identification reader, with a communications module of the reader in a closed position;

FIG. 2 is a rear view of the reader depicted in FIG. 1, showing the communications module in the closed position;

FIG. 3 is a rear perspective view of the reader depicted in FIGS. 1 and 2, showing the communications module in a position between the open and closed positions;

DETAILED DESCRIPTION OF PREFERRED EMBODIMENTS

FIGS. 1 to 8, 11A, and 11B depict a preferred embodiment of an RFID reader 100. The reader 100 comprises a body 102. The body 102 includes a casing 104. The casing 104 preferably has the relatively thin, elongated portion that can act as a handle by which the user can grasp and hold the reader 100.

Figure 6:
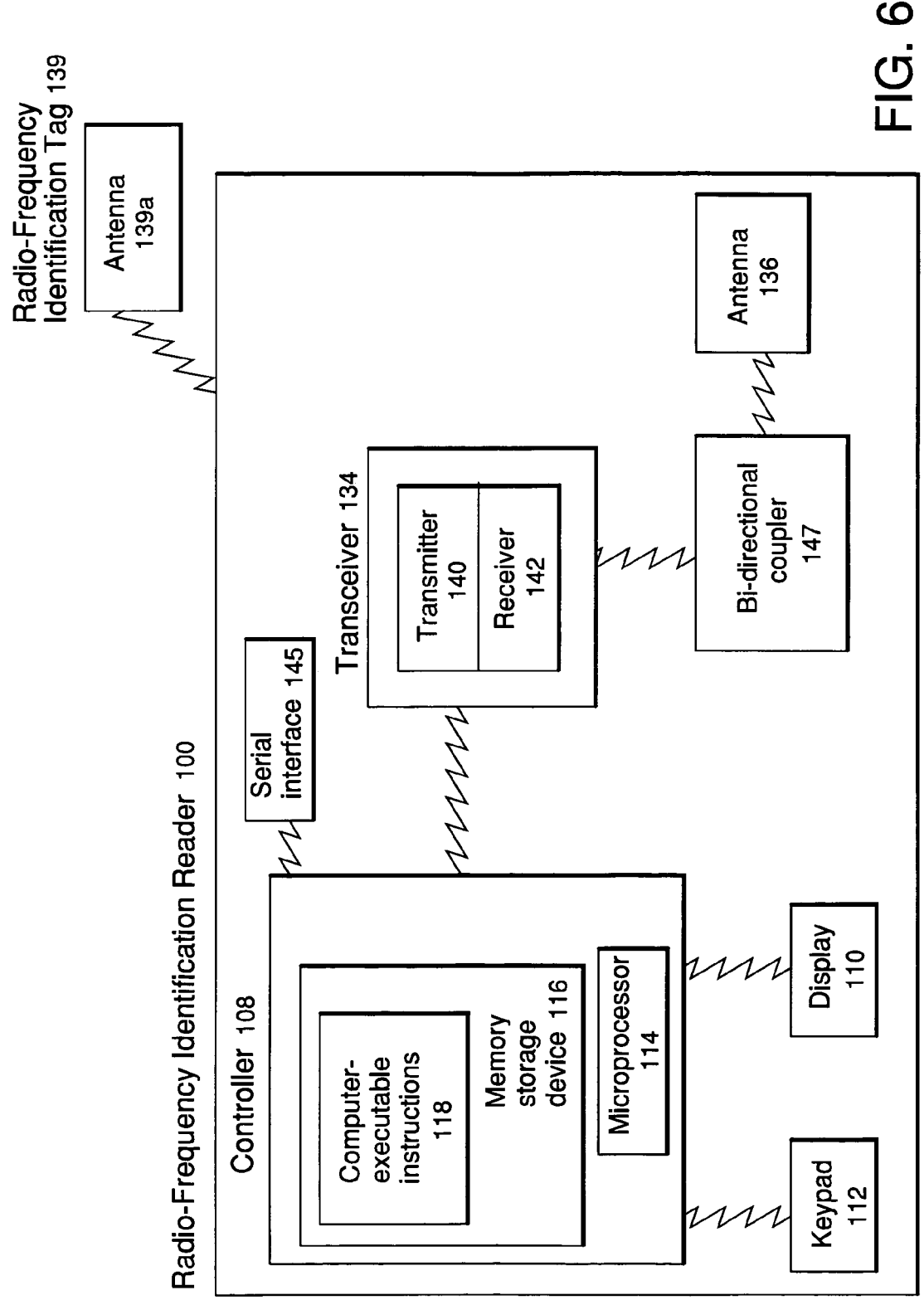
FIG. 6 is a block diagram depicting various electrical components of the reader shown in FIGS. 1-5.

The body 102 includes a controller 108, a display 110, and a keypad 112 housed within the casing 102 (see FIGS. 1 and 6). The controller 108 comprises a processor such as a microprocessor 114 (see FIG. 6). The controller 108 also includes a memory-storage device 116 communicatively coupled to the microprocessor 114, and a set of computer-executable instructions 118 stored on the memory-storage device 116.

The display 110 and the keypad 112 are communicatively coupled to the processor 108. The keypad 112 preferably is located on the relatively thin (handle) portion of the casing 104, and facilitates entry of commands, data, and other inputs by the user. The display 110 can be used to monitor operating parameters of the reader 100, data obtained from tags read by the reader 100, etc. The body 102 can also include a power source, such as a rechargeable battery (not shown), for powering the controller 108, display 110, keypad 112, and other components of the reader 100.

The reader 100 also comprises a communications module 130. The communications module 130 includes a casing 132, a transceiver 134 communicatively coupled to the controller 108, and an antenna 136 (see FIGS. 2-7). The transceiver 134 and the antenna 136 are housed within the casing 132.

The casing 132 is movably coupled to the casing 104 of the body 102, as discussed below. The casing 132 preferably is formed from a non-metallic material, such as plastic, to help minimize the potential for interference with the antenna 136. For example, the casing 132 can be formed from polycarbonate, ABS, ZENOY, etc. (The use of metallic materials throughout the communications module 130, in general, should be limited for the same reason.)

The communications module 130 facilitates communications to and from a passive RFID tag 139 (the tag 139 is depicted diagrammatically in FIG. 6). The transceiver 134 includes a transmitter 140 and a receiver 142 (see FIGS. 5 and 6). The transmitter 140 and receiver 142 can be mounted on a printed circuit board 144 located within the casing 132. The transmitter 140 and receiver 142 preferably are disposed proximate the center of the printed circuit board 144. (The transceiver 134 can be positioned within the body 102 in alternative embodiments.)

The transmitter 140 and the receiver 142 are communicatively coupled to the controller 108 (see FIG. 6). The transmitter 140 and the receiver 142 are communicatively coupled to the antenna 136 by a bi-directional coupler 147 or other suitable device, e.g., a circulator, that facilitates bi-directional transmission of signals through the antenna 136.

The transmitter 140 includes an oscillator that generates an RF carrier frequency. The carrier frequency can be, for example, approximately 125 kHz or approximately 13.5 MHz. The transmitter 140 sends an RF signal modulated to the carrier frequency to the antenna 136, which radiates the carrier signal.

The tag 139, upon entering the magnetic field associated with the carrier signal and becoming energized, modulates the carrier signal in the manner described above. The antenna 136 receives the modulated signal, and passes the signal to the receiver 142 by way of the bi-directional coupler 147.

The receiver 142 includes a filter that removes the carrier frequency from the sensed signal, and sends the resulting information signal to the controller 108. The controller 108 demodulates the information signal. In particular, the computer-executable instructions 118 of the controller 108 can include algorithms that decode the information encoded by the tag 139 in the modulated carrier signal.

The computer-executable instructions 118 can also include algorithms that match the decoded information to a data base stored in the memory-storage device 116. For example, the information encoded by the tag 139 can include product identification information. The computer-executable instructions 118 can match the product identification information with information in the data base to identify the type of product associated with the tag 139, the serial number of the product, or other specific identifying information about the product, etc.

The information can be displayed on the display 110, processed further by the controller 108, or stored in a data base in the memory-storage device 116. The reader 100 can be equipped with a serial interface 145 or other suitable device that permits the reader 100 to download the information to (and upload information from) an external data base (see FIG. 6).

The antenna 136 can be any type of antenna capable of radiating and sensing a time-varying, near-field magnetic field. The antenna 136 preferably is a loop antenna, although a series or parallel resonant circuit antenna can be used in the alternative. The antenna 136 preferably can be formed as a single layer or multiple layers of electrically-conductive traces or wiring, arranged in a single turn or multiple turns on the printed circuit board 144 (see FIG. 5).

The optimal number of layers and turns for the antenna 136 is application dependent. In particular, the optimal number of layers and turns depends upon the overall length of the antenna 136 and the size of the printed circuit board 144. The length of the antenna 136 is dependent upon the frequency of the carrier signal to be produced by the reader 100.

The communications module 130 is movably coupled to the body 102, as noted above. More particularly, the casing 132 of the communications module 130 is coupled to the casing 104 of the body 102 by way of two hinges 146 (see FIGS. 2-4, 7, and 8). (Alternative embodiments can comprise more or less than two of the hinges 146.)

The hinges 146 permit the communications module 130 to pivot in relation to the body 102. In particular, the communications module 130 can pivot between a closed, or stored position (FIGS. 1 and 2) and an opened position (FIG. 4).

The hinge point of the communications module 130 preferably is located proximate the upper end of the casing 104 (from the perspective of FIG. 2). The direction of motion of the communications module 130 in relation to the body 102 is denoted in the figures by the arrows 148. Preferably, the range of motion of the communications module 130 is approximately one-hundred eighty degrees.

Figure 7:
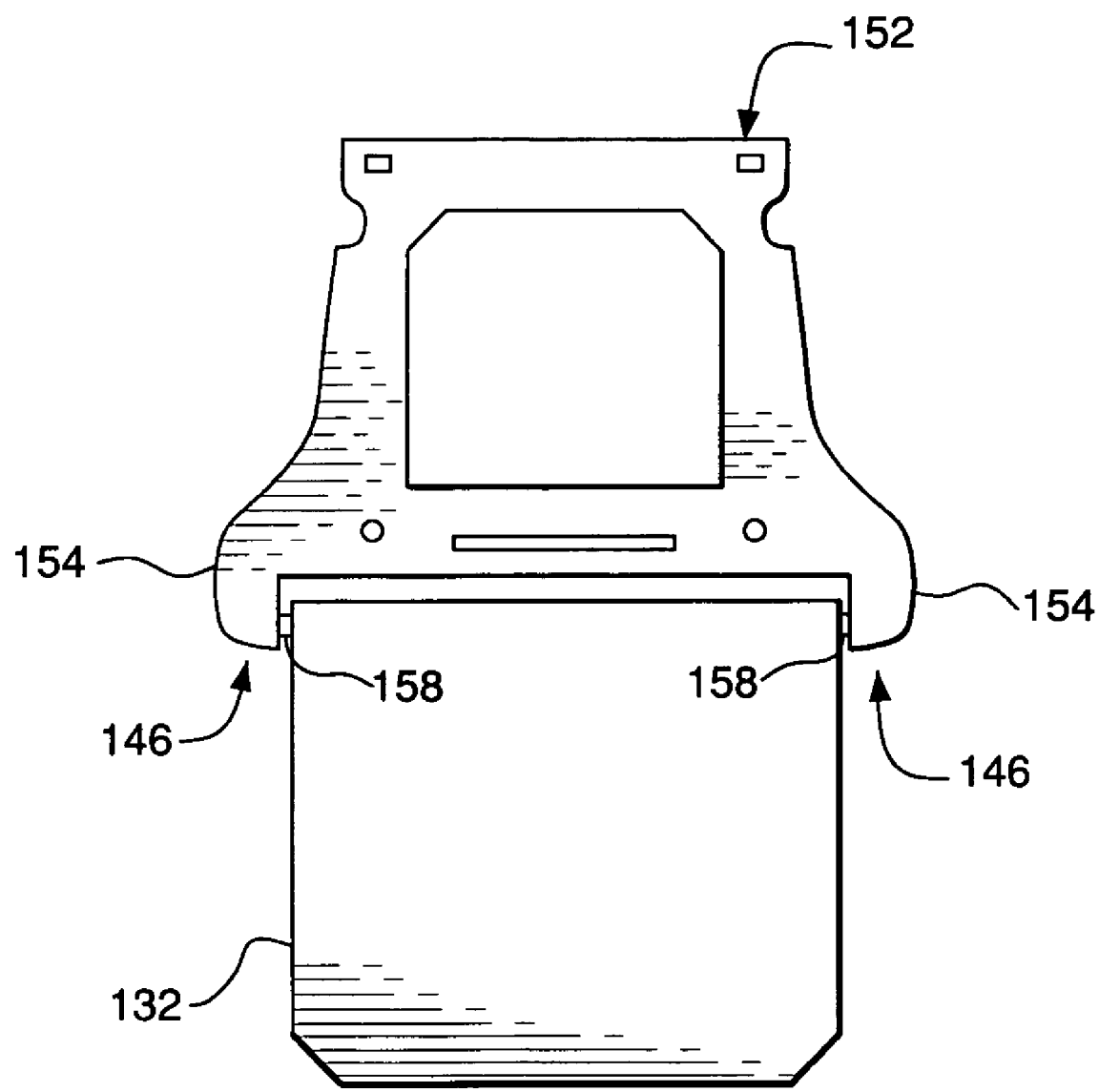
FIG. 7 depicts the communications module and a hinge frame of the reader shown in FIGS. 1-6.
Figure 8:
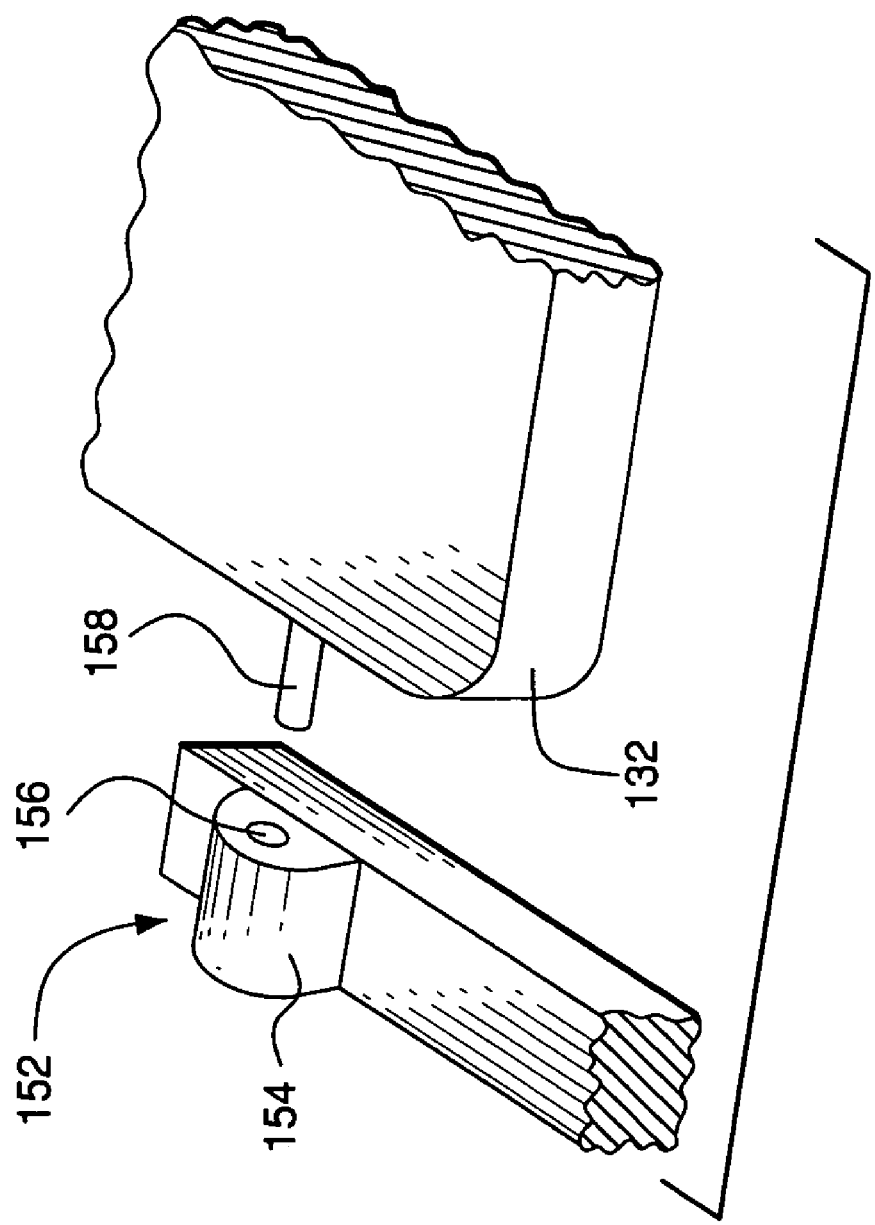
FIG. 8 is a magnified exploded view of the area designated "A" in FIG. 4.

The reader 100 preferably comprises a hinge frame 152 (see FIG. 7). The hinge frame 152 has one of the pin-receiving members 154 formed on each side thereof. Each pin-receiving member 154 has a bore 156 defined therein (see FIGS. 5 and 8). The casing 132 of the communications module 130 includes two pins 158 located on opposing sides of the casing 132. Each bore 156 receives a corresponding one of the pins 158, so that the pin 158 can rotate within the bore 156. Each pair of associated pins 158 and pin-receiving members 154 forms one of the hinges 146.

Figure 4:
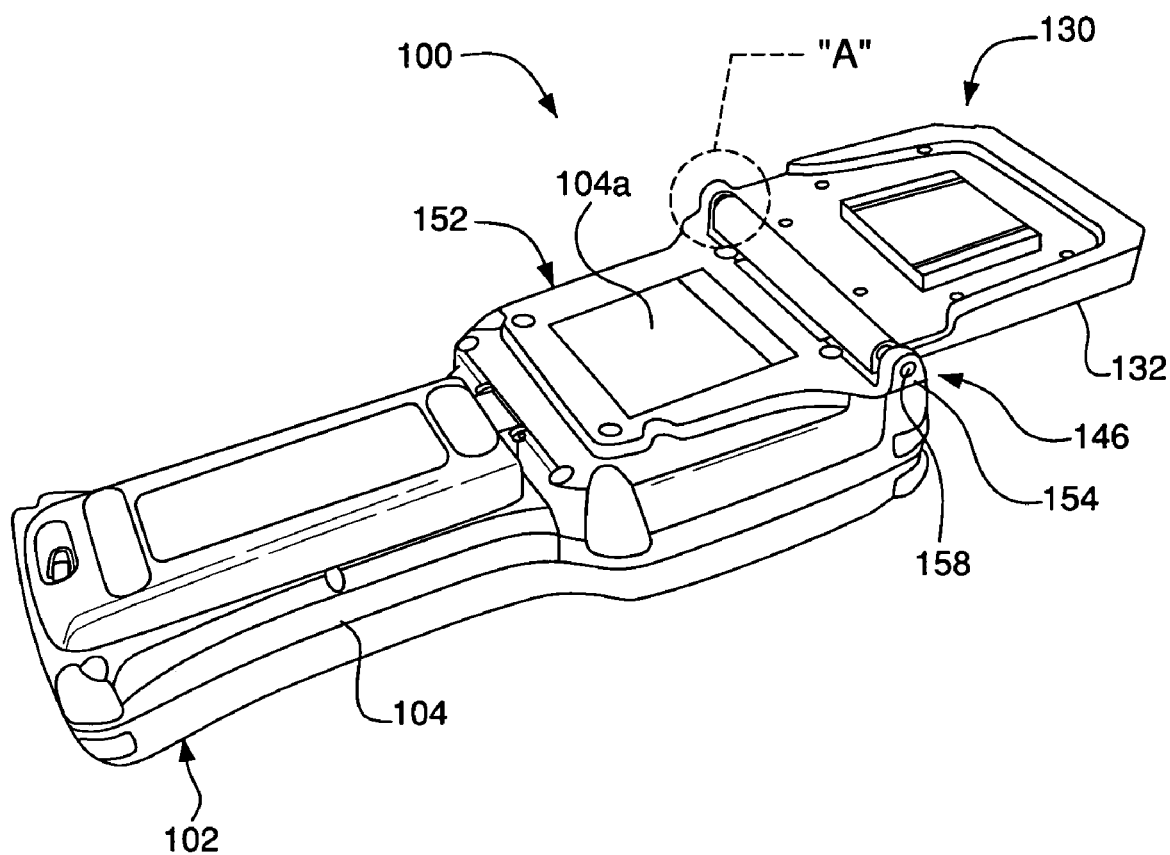
FIG. 4 is a rear perspective view of the reader depicted in FIGS. 1-3, showing the communications module in the open position.

The hinge frame 152 can be fastened to a rear surface 104a of the casing 104 by a suitable means such as screws (see FIGS. 3 and 4). This arrangement causes the communications module 130 to be located in back of the upper portion of the body 102 (from the perspective of FIG. 1) when the communications module 130 is in its closed position.

The pins 158 and the hinge frame 152 (including the pin-receiving members 154) preferably are formed from a non-metallic material, such as plastic, to help minimize the potential for interference with the antenna 136. For example, the pins 158 and the hinge frame 152 can be formed from polycarbonate, ABS, ZENOY, etc.

The casing 132 of the communications module 130 preferably has a width and a height approximately equal to, or slightly smaller than, the respective width and height of the rear surface 104a of the casing 104. The communications module 130 therefore does not substantially increase the external dimensions of the reader 100 when the communications module 130 is in it is closed position.

The hinges 146 preferably have features that cause the communications module 130 to remain in one of a number of discrete positions in relation to the body 102, until moved by the user. In other words, the noted features permit the user to position the communications module 130 in a particular orientation in relation to the body 102, and cause the communications module 130 to remain in that position until moved by the user.

Figure 9:
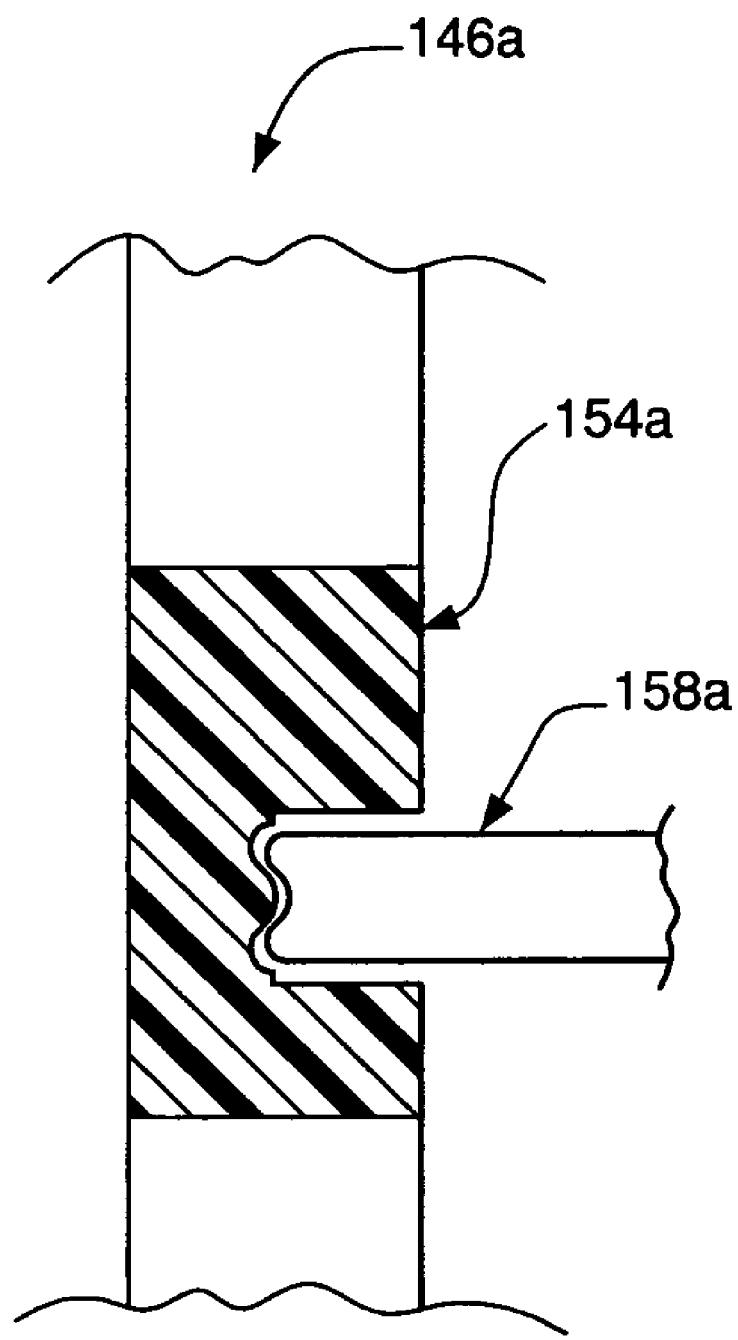
FIG. 9 is a partial cross-sectional view of an alternative embodiment of a hinge of the reader shown in FIGS. 1-8.

For example, FIG. 9 depicts a hinge 146a comprising a pin 158a and a pin-receiving member 154a. The pin 158a includes an end surface having indentations formed therein. The pin-receiving member 154a includes a stop having complementary indentations formed therein. The pin 158a can be biased toward the stop by a suitable means such as a spring (not shown). The bias drives the indented surfaces of the pin 158a and the pin-receiving member 154a together, as shown in FIG. 9.

The complementary indentations on the pin 158a and the pin-receiving member 154a cause the pin-receiving member 154a to resist rotation of the pin 158a (and the casing 132), until the user exerts sufficient force on the casing 132 to overcome the bias that drives the indented surfaces together. The indentations on the pin 158a and the pin-receiving member 154a preferably are configured so that the communications module 130 can be restrained in the closed position, the opened position, and in plurality of positions between the closed and opened positions spaced apart in angular increments of approximately forty-five degrees.

Alternatively, a friction-producing material can be disposed between the outer surface of each pin 158 and the periphery of the associated bore 156, to resist movement of the pin 158 in relation to the associated pin-receiving member 154. Other alternative embodiments can include a separate friction-producing member between the casing 132 of the communications module and the casing 104 of the body 102.

Figure 5:
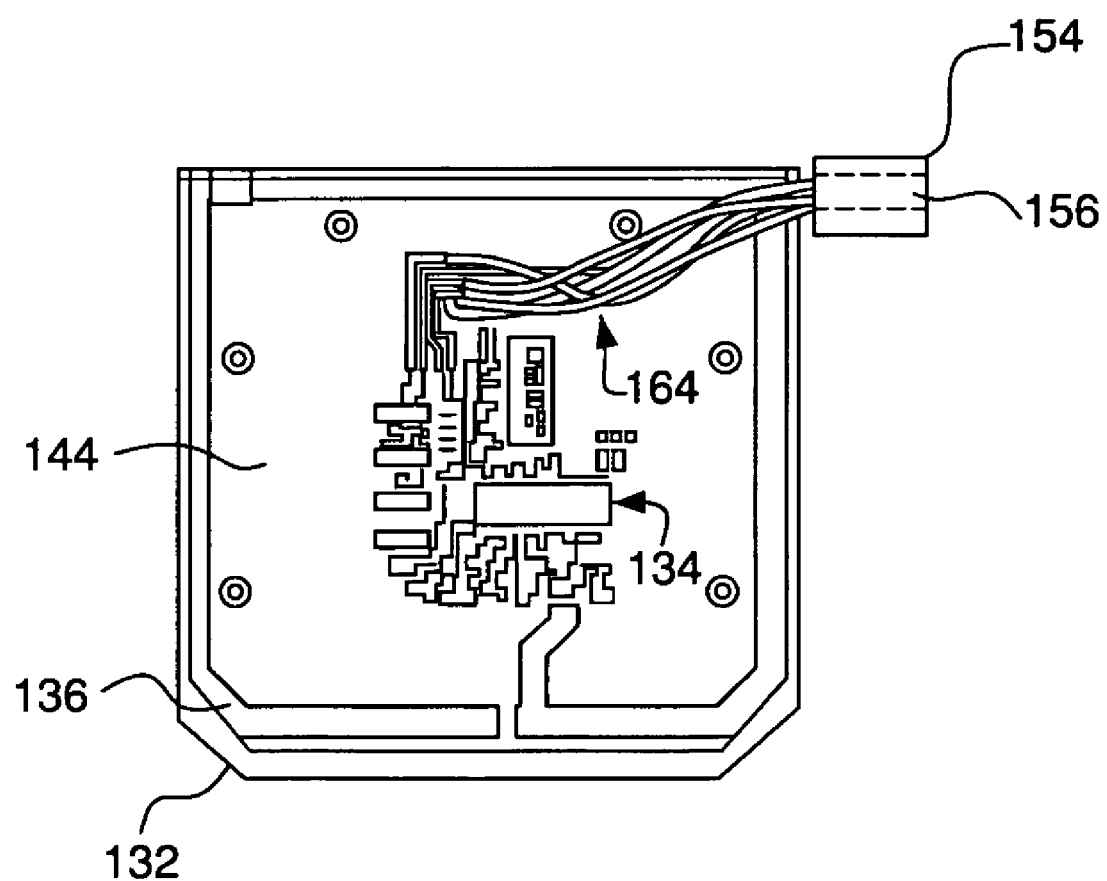
FIG. 5 depicts the communications module and a pin-receiving member of the reader shown in FIGS. 1-4, with a portion of a casing of the communications module removed.

The printed circuit board 144 is communicatively coupled to the controller 108 by wiring 164 (see FIG. 5). The wiring 164 preferably is high-stranding wire, to reduce the potential for the wiring 164 to break when it is bent to facilitate routing within the reader 100.

The wiring 164 preferably is routed between the one of the pin-receiving members 154 and the associated pin 158, as shown in FIG. 5. The wiring 164 preferably is routed so as to minimize (or eliminate) the length of the wiring 136 that extends parallel to the antenna 136. This arrangement is believed to help minimize the potential for interference the between the wiring 164 and the antenna 136.

During use of the reader 100, the user can move the communications module 130 to a position where the communications module 130 is substantially parallel to the RFID tag 139. More particularly, the user can manually grasp or flip the casing 132 so that the rear surface 133 of the casing 132 is substantially parallel to the tag 139. This arrangement places the antenna 136 of the reader 100 in a substantially parallel orientation with an antenna 139a of the tag 139.

Placing the antenna 136 and the antenna 139a in substantially parallel orientations can help to maximize the read distance of the reader 100, as discussed above. Hence, the user does not need to position the reader 100 as close to the tag 139 as would otherwise be required to interrogate the tag 139, when the antenna 136 and the antenna 139a are substantially parallel. The reader 100 provides the user with the ability to move the antenna 136 independent of the body 102 (which typically is grasped and held by the user). Hence, the user can align the antenna 136 with the tag 139 so as to maximize the read distance of the reader 100, without twisting or otherwise contorting his or her wrist, arm, etc.

Figure 10:
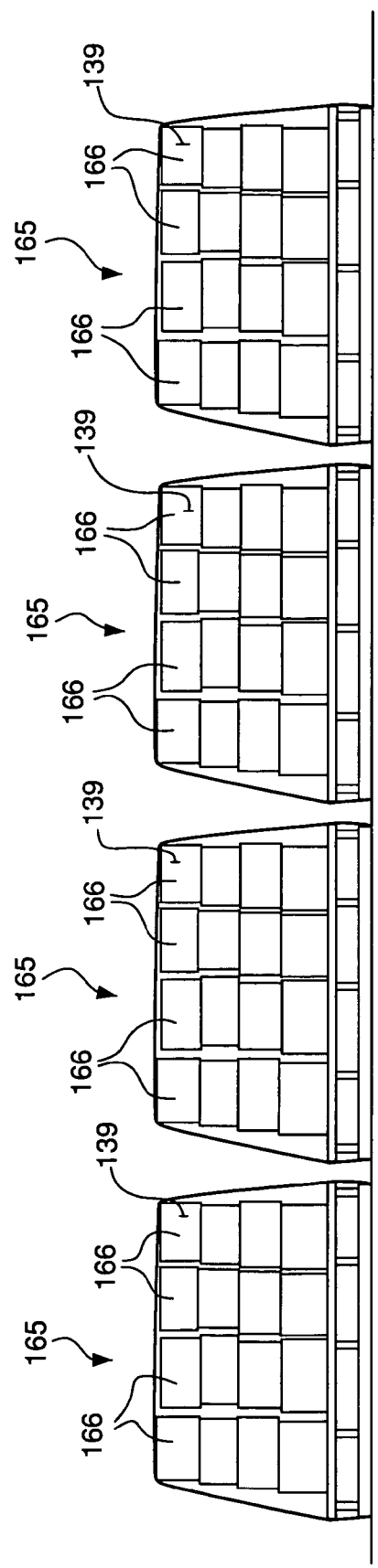
FIG. 10 depicts palletized groups of shipping cartons having radio frequency identification tags attached thereto.
Figure 11A:
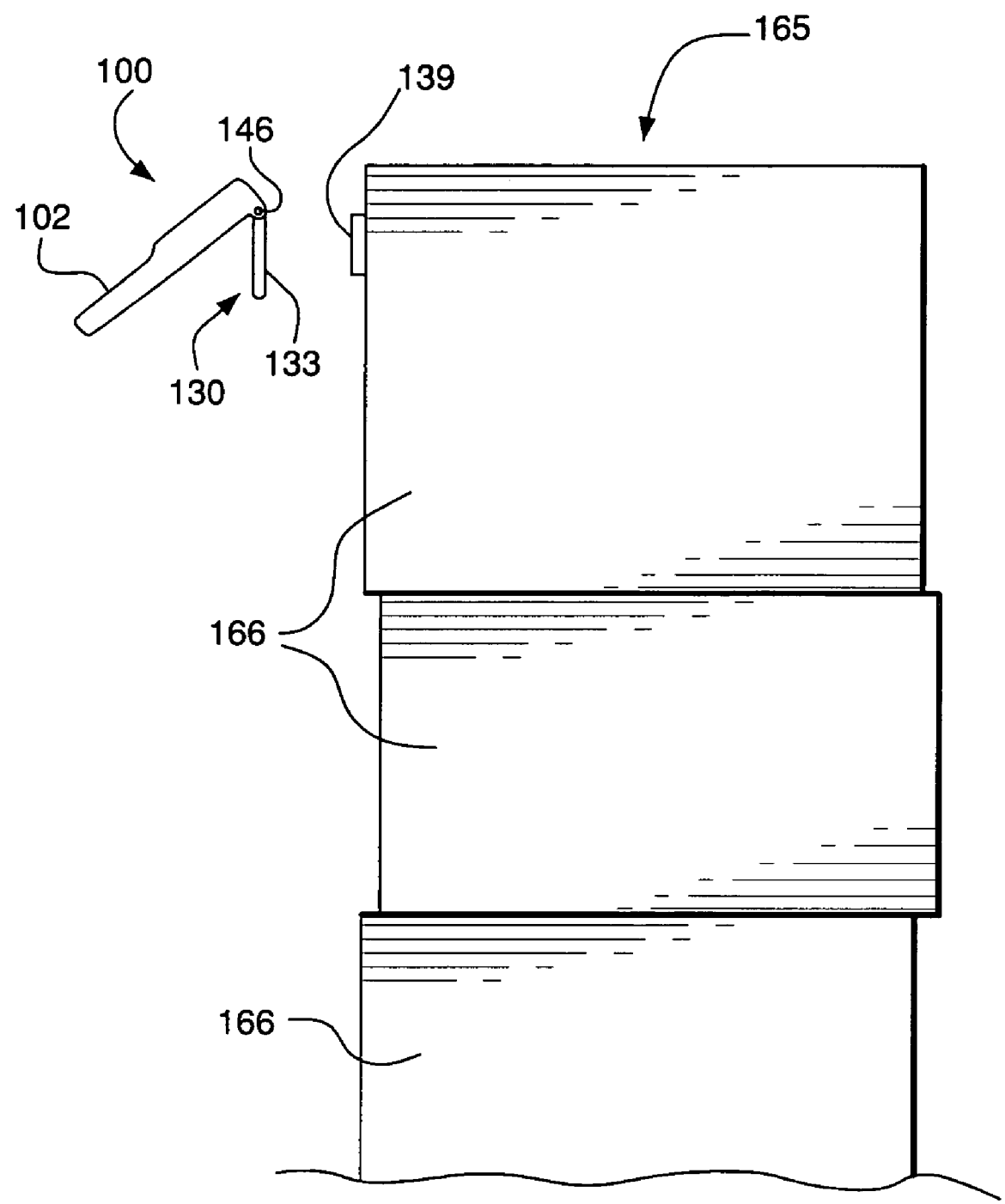
FIG. 11A depicts the reader shown in FIGS. 1-8 being used to interrogate one of the tags depicted in FIG. 10, from a perspective rotated approximately ninety degrees from the perspective of FIG. 10.
Figure 11B:
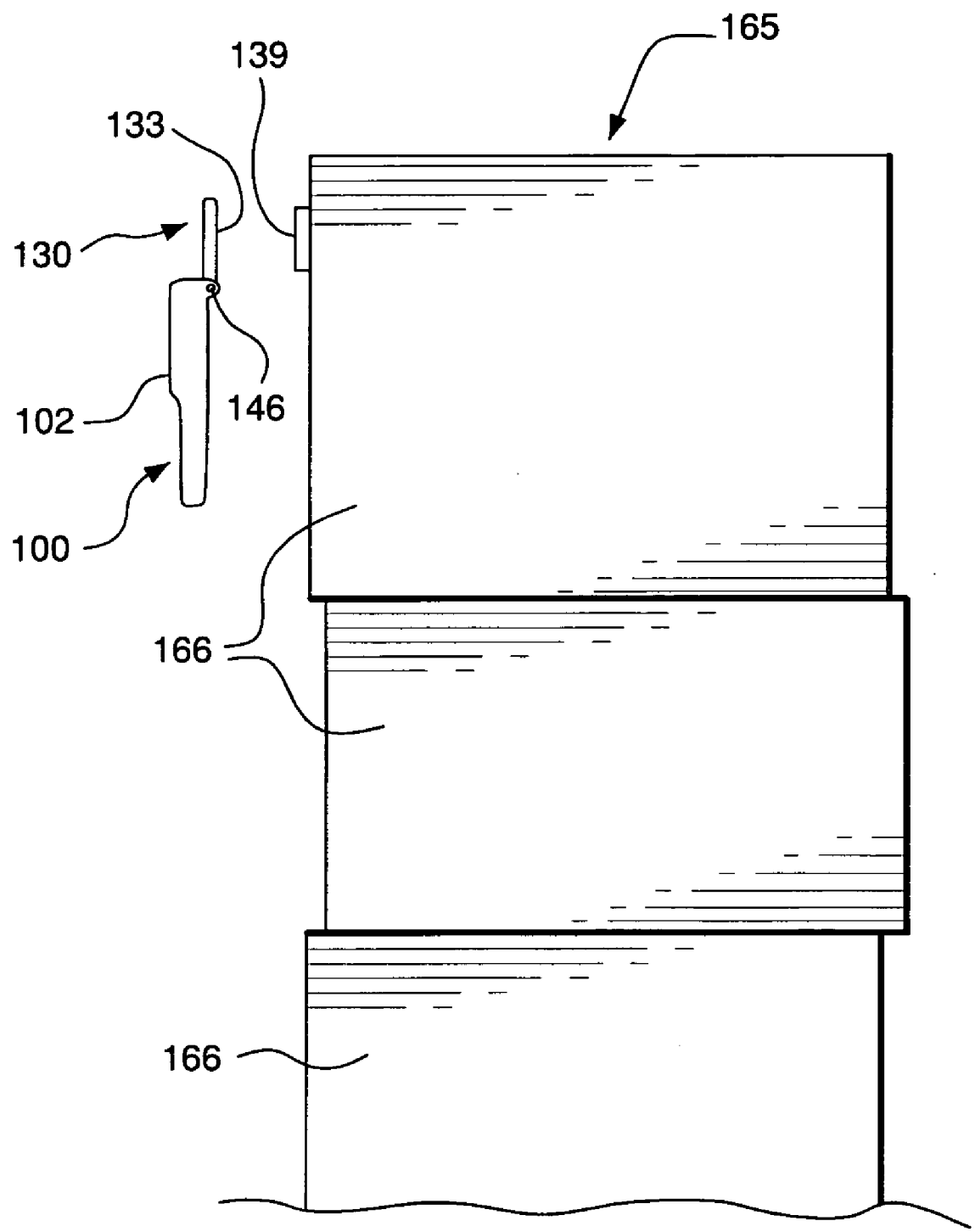
FIG. 11B depicts the reader shown in FIGS. 1-8 and 11A being used to interrogate one of the tags depicted in FIG. 9, from a perspective rotated approximately ninety degrees from the perspective of FIG. 9, and with the reader in a different orientation from the orientation depicted in FIG. 11A.

For example, the reader 100 can be used to read tags 139 attached to palletized stacks 165 of shipping crates or containers 166 located a warehouse, shipping area, transporting vehicle, etc. (see FIGS. 10-11B). In such applications, one tag 139 is commonly attached to one of the shipping containers 166 of each pallet 165, at approximately the same location on each pallet 165 (see FIG. 10).

The user (not pictured) can initially adjust the position of the communications module 130 (and the antenna 136) in preparation for reading the tag 139 attached to a first of the pallets 165. The position of the communications module 130 can be adjusted as discussed above. More particularly, the casing 132 of the reader 100 can be moved into a position where the rear surface 133 of the casing 132 is substantially parallel to the tag 139, while the user holds the reader 100 in a comfortable position proximate the tag 139 (see FIGS. 11A and 11B; the size of the tag 139 is exaggerated in FIGS. 11A and 11B, for clarity.)

After interrogating the tag 139 on the first pallet 165, the user can interrogate the tags 139 on other pallets 165 in the same manner. The tags 139 are attached to the same approximate location on each pallet 165, as noted above. The user therefore can move between pallets 165 without a need to readjust the position of the communications module 130 to achieve the maximum read distance, while continuing to hold the reader 100 in a comfortable position. Hence, the tags 139 on the pallets 165, it is believed, can be read more quickly than otherwise would be possible, with minimal potential for the user to become fatigued or injured.

The above application is discussed for exemplary purposes only. The reader 100 can be used in a similar manner in other applications that require the interrogation of tags 139 attached to multiple items, at the same approximate location thereon. For example, RFID tags often are attached to the ears (or other parts) of livestock. The communications module 130 of the reader 100 can initially be adjusted for maximum read distance as the tag on the first animal is interrogated, while the user holds the reader 100 in a comfortable position. The tags on the other animals can thereafter be interrogated without a need to readjust the communications module 130 to achieve the maximum read distance.

In other applications, the reader 100 can be placed in a permanently or semi-permanently mounted holder or similar device (not shown). This arrangement permits the tagged item to be brought into proximity with the reader 100 (rather than having the user bring the reader 100 into proximity with the tagged item). The position of the communications module 130 can be adjusted for maximum read distance once the reader 100 is placed in the holder, based on the orientation at which the tagged item will be brought into proximity with the reader 100. This arrangement can potentially facilitate use of the reader 100 in permanently or semi-permanently mounted applications that would not be suitable for a reader having a fixed antenna.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

For example, although a preferred embodiment that operates based on inductive coupling has been described, the principles of the invention can be applied to RFID systems that operate based on propagation coupling. The principles of the invention can also be applied to RFID devices having dipole antennas or other types of directional antennas, and to RFID systems that comprise active RFID tags.

Moreover, the internal components of the reader 100 have been described in detail for exemplary purposes only. The principles of the invention can be applied to RFID devices having internal configurations substantially different than that of the reader 100.

Figure 12B:
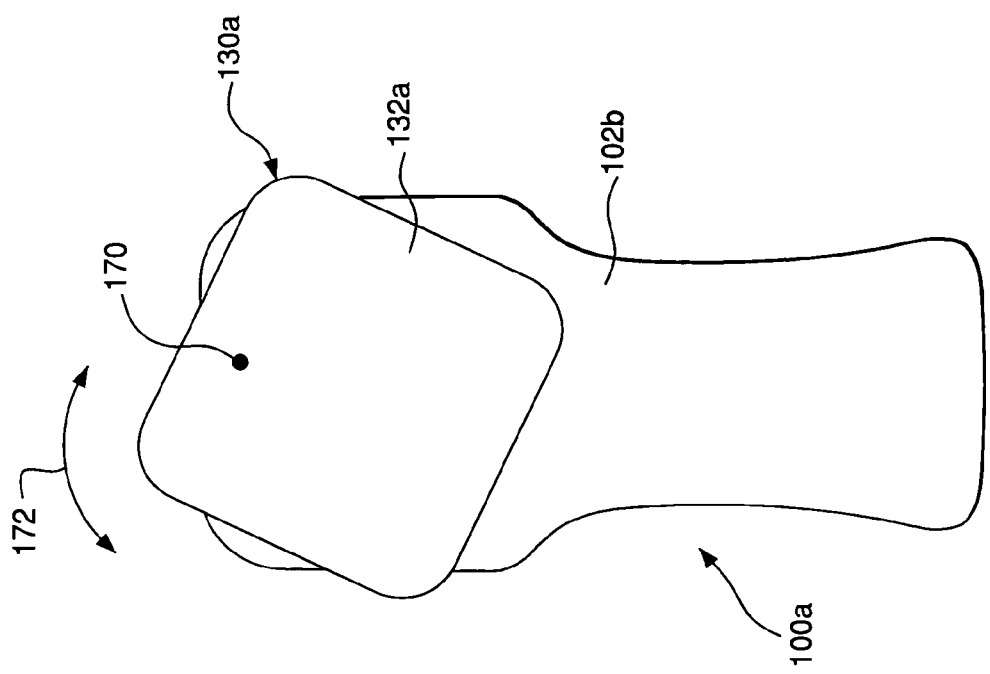
FIGS. 12A, 12B, and 13 depicts alternative embodiments of the reader shown in FIGS. 1-8, 11A, and 11B.
Figure 12A:
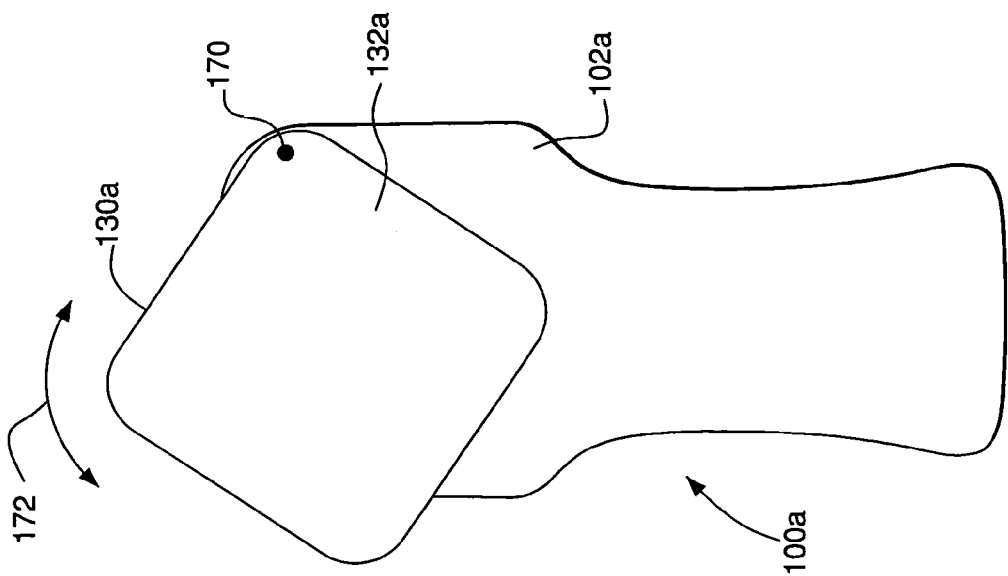

Moreover, the communications module 130 can be movably coupled to the body in a manner other than that described above. For example, FIG. 12A depicts an alternative embodiment in the form of a reader 100a. A casing 132a of a communications module 130a of the reader 100a is movably coupled to a body 102a of the reader 100a by a pin 170, in lieu of the hinges 146. (The body 102a and communications module 130a otherwise are substantially identical to the respective body 102 and communications module 130 of the reader 100.) This arrangement permits the communications module 130a to pivot, or rotate, between an open and a closed position in relation to the body 102a, as denoted by the arrow 172 in FIG. 12A. FIG. 12B depicts an embodiment in which the pin 170 is positioned at a location on the communications module 130a different than that depicted in FIG. 12A.

Figure 13:
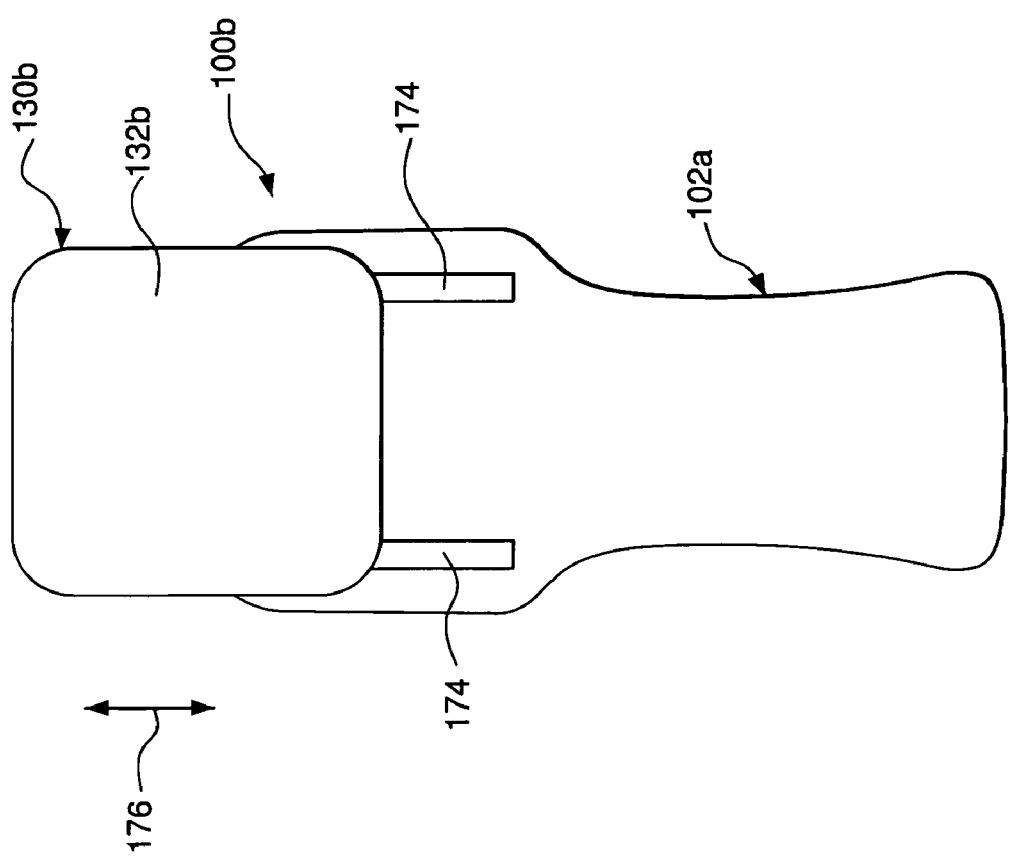

FIG. 13 depicts another alternative embodiment in the form of a reader 100b. A casing 132b of a communications module 130b of the reader 100b is mounted on rails 174 secured to a body 102b of the reader 100b. (The body 102b and communications module 130b otherwise are substantially identical to the respective body 102 and communications module 130 of the reader 100.) This arrangement permits the communications module 130 to slide linearly between an open and a closed position in relation to the body 102b, as denoted by the arrow 176 in FIG. 13.

What is claimed is:

1. A radio frequency identification device, comprising:
    a first casing that includes a pin, and a second casing movably coupled to the first casing;
    a hinge frame secured to the second casing and having a pin-receiving member formed therein, wherein the pin-receiving member receives the pin so that the pin can rotate in relation to the pin-receiving member whereby the pin and the pin-receiving member form a hinge;
    a transceiver housed within one of the first and second casings, the transceiver comprising a transmitter for generating a radio frequency carrier signal and a receiver for detecting modulation of the radio frequency carrier signal caused by a radio frequency identification tag;
    an antenna housed within the first casing and communicatively coupled to the transceiver for broadcasting the radio frequency carrier signal, and sensing the radio frequency carrier signal after the radio frequency carrier signal is modulated by the radio frequency identification tag; and
    a controller housed within the second casing and communicatively coupled to the transceiver for interpreting information encoded in the radio frequency carrier signal by the radio frequency identification tag.

2. The device of claim 1, wherein the transceiver is communicatively coupled to the controller by wiring and the wiring is routed through the hinge.

3. The device of claim 2, wherein the wiring is multi-strand wiring.

4. The device of claim 1, wherein the hinge is formed from plastic.

5. The device of claim 1, wherein the first casing can rotate through an arc of approximately one-hundred eighty degrees in relation to the second casing.

6. The device of claim 1, further comprising a printed circuit board housed within the first casing, wherein the antenna and the transceiver are mounted on the printed circuit board.

7. The device of claim 1, wherein the antenna is a loop antenna.

8. The device of claim 1, wherein the antenna is a multi-layer, multi-turn antenna.

9. The device of claim 1, further comprising means for restraining the first casing in relation to the second casing.

10. The device of claim 1, wherein an end of the pin has an indented surface and the pin-receiving member has a complementary indented surface that restrains the pin from rotating in relation to the pin-receiving member.

11. The device of claim 10, further comprising a spring for biasing the indented surface of the pin toward the indented surface of the pin-receiving member.

12. A hand-held radio frequency identification reader, comprising:
    a first casing suitable for being grasped by a user;
    a second casing movably coupled to the first casing and including a pin;
    a hinge frame secured to the first casing and having a pin-receiving member formed therein, wherein the pin-receiving member receives the pin so that the pin can rotate in relation to the pin-receiving member whereby the pin and the pin-receiving member form a hinge;
    a transceiver housed within one of the first and second casings; and
    an antenna housed within the second casing and communicatively coupled to the transceiver for communicatively coupling the reader to a radio frequency identification tag, wherein the second casing can be aligned with the radio frequency identification tag to substantially maximize a read distance of the reader while the first casing is held in a substantially fixed position in relation to the radio frequency identification tag.

13. The device of claim 12, wherein the hinge is formed from plastic.

14. The reader of claim 12, wherein the first casing can rotate through an arc of approximately one-hundred eighty degrees in relation to the second casing.

15. The reader of claim 12, wherein the antenna is a loop antenna.

16. The reader of claim 12, wherein the antenna is a multi-layer, multi-turn antenna.

17. The reader of claim 12, further comprising means for restraining the first casing in relation to the second casing.

18. The reader of claim 12, wherein the first casing is pivotally coupled to the second casing by way of the pin.

19. The reader of claim 12, further comprising a processor communicatively coupled to the transceiver for decoding data from the radio frequency identification tag, and a keypad and a display communicatively coupled to the processor.

20. The reader of claim 19, wherein the first casing has a relatively narrow portion suitable for being grasped by the user and having the keypad mounted thereon, and a relatively wide portion having the display mounted thereon.

21. The reader of claim 19, wherein the transceiver is communicatively coupled to the processor by wiring and the wiring is routed through the hinge.

22. The reader of claim 21, wherein the wiring is multi-strand wiring.

23. A method for interrogating a radio frequency identification tag with a radio frequency identification device, comprising restraining a body of the radio frequency identification device in relation to the radio frequency identification tag while moving an antenna of the radio frequency identification device in relation to the radio frequency identification tag so that the antenna is substantially parallel to an antenna of the radio frequency identification tag to substantially optimize a read distance of the radio frequency identification device.

24. The method of claim 23, wherein restraining a body of the radio frequency identification device in relation to the radio frequency identification tag comprises grasping the body manually.

25. The method of claim 23, wherein restraining a body of the radio frequency identification device in relation to the radio frequency identification tag comprises placing the radio frequency identification device in a holder for the radio frequency identification device.

26. The method of claim 23, wherein moving an antenna of the radio frequency identification device in relation to the radio frequency identification tag comprises rotating the antenna in relation to the body.

27. The method of claim 23, wherein moving an antenna of the radio frequency identification device in relation to the radio frequency identification tag comprises sliding the antenna in relation to the body.

28. The method of claim 23, wherein moving an antenna of the radio frequency identification device in relation to the radio frequency identification tag comprises moving a casing that houses the antenna.

29. A method for interrogating a plurality of radio frequency identification tags disposed on a plurality of items using a radio frequency identification reader, comprising:
holding a portion of the radio frequency identification reader in a fixed position in relation to a first of the radio frequency identification tags disposed on a first of the items;
moving an antenna of the radio frequency identification reader in relation to the first of the radio frequency identification tags so that the antenna is substantially parallel to an antenna of the first of the radio frequency identification tags;
communicatively coupling the radio frequency identification reader and the first of the radio frequency identification tags to obtain information from the first of the radio frequency identification tags;
holding the radio frequency identification reader in a fixed position in relation to a second of the radio frequency identification tags disposed on a second of the items so that the antenna of the radio frequency identification reader is substantially parallel to an antenna of the second of the radio frequency identification tags, the fixed position in relation to a second of the radio frequency identification tags being substantially the same as the fixed position in relation to a first of the radio frequency identification tags; and
communicatively coupling the radio frequency identification reader and the second of the radio frequency identification tags to obtain information from the second of the radio frequency identification tags.

30. A radio frequency identification device, comprising:
a first casing and a second casing movably coupled to the first casing by a rail;
a transceiver housed within one of the first and second casings, the transceiver comprising a transmitter for generating a radio frequency carrier signal and a receiver for detecting modulation of the radio frequency carrier signal caused by a radio frequency identification tag;
an antenna housed within the first casing and communicatively coupled to the transceiver for broadcasting the radio frequency carrier signal, and sensing the radio frequency carrier signal after the radio frequency carrier signal is modulated by the radio frequency identification tag; and
a controller housed within the second casing and communicatively coupled to the transceiver for interpreting information encoded in the radio frequency carrier signal by the radio frequency identification tag.

31. A radio frequency identification device, comprising:
a first and a second casing;
a hinge that movably couples the first casing to the second casing, the hinge comprising a pin-receiving member and a pin rotatably disposed within the pin-receiving member, wherein an end of the pin has an indented surface and the pin-receiving member has a complementary indented surface that restrains the pin from rotating in relation to the pin-receiving member;
a transceiver housed within one of the first and second casings, the transceiver comprising a transmitter for generating a radio frequency carrier signal and a receiver for detecting modulation of the radio frequency carrier signal caused by a radio frequency identification tag;
an antenna housed within the first casing and communicatively coupled to the transceiver for broadcasting the radio frequency carrier signal, and sensing the radio frequency carrier signal after the radio frequency carrier signal is modulated by the radio frequency identification tag; and
a controller housed within the second casing and communicatively coupled to the transceiver for interpreting information encoded in the radio frequency carrier signal by the radio frequency identification tag.

* * * * *